(12) United States Patent
Mahgerefteh et al.

(10) Patent No.: US 7,263,291 B2
(45) Date of Patent: Aug. 28, 2007

(54) WAVELENGTH DIVISION MULTIPLEXING SOURCE USING MULTIFUNCTIONAL FILTERS

(75) Inventors: Daniel Mahgerefteh, Los Angeles, CA (US); Parviz Tayebati, Weston, MA (US)

(73) Assignee: Azna LLC, Wilmington, MA (US)

( * ) Notice: Subject to any disclaimer, the term of this patent is extended or adjusted under 35 U.S.C. 154(b) by 583 days.

(21) Appl. No.: 10/615,218

(22) Filed: Jul. 8, 2003

(65) Prior Publication Data

US 2004/0096221 A1    May 20, 2004

Related U.S. Application Data

(60) Provisional application No. 60/395,073, filed on Jul. 9, 2002.

(51) Int. Cl.
*H04J 14/02* (2006.01)
(52) U.S. Cl. .............................. 398/82; 398/84; 398/85; 398/87; 398/88; 398/91
(58) Field of Classification Search .................. 398/79, 398/82, 84, 85, 87, 88, 91; 385/15, 24, 27, 385/37
See application file for complete search history.

(56) References Cited

U.S. PATENT DOCUMENTS 4,841,519 A * 6/1989 Nishio .......................... 398/91
5,737,104 A * 4/1998 Lee et al. ...................... 398/79
6,104,851 A    8/2000 Mahgerefteh
6,748,133 B2 * 6/2004 Liu et al. ....................... 385/24

* cited by examiner

*Primary Examiner*—Dalzid Singh
(74) *Attorney, Agent, or Firm*—Pandiscio & Pandiscio

(57) ABSTRACT

This invention provides a system that combines a wavelength multiplexer with an FM discriminator for chirp reduction and wavelength locker in a filter to produce a wavelength division multiplexed signal with reduced chirp. A partially frequency modulation laser signal is converted into a substantially amplitude modulation laser signal. This conversion increases the extinction ratio of the input signal and further reduces the chirp. A wavelength division multiplexing (WDM) method is used for transmitting high capacity information through fiber optics systems where digital information is carried on separate wavelengths through the same fiber. Separate transmitters normally generate their respective signals that are transmitted at different wavelengths. These signals are then combined using a wavelength multiplexer to transmit the high capacity information through the fiber optic system. Various technologies can be used to multiplex the signals such as, for example, thin film filters, or arrayed waveguide gratings. In a WDM system, a wavelength locker may also be used that fixes the center wavelength of a transmitter to a reference. Wavelength lockers may include etalons or fiber gratings, either of which provides a reference wavelength. A control circuit typically compares the wavelength of the transmitter to the reference. An error signal adjusts the transmitter format wavelength by varying temperature or by other means to keep it locked to the reference wavelength.

23 Claims, 4 Drawing Sheets

WAVELENGTH DIVISION MULTIPLEXING SOURCE USING MULTIFUNCTIONAL FILTERS

RELATED APPLICATION

This application claims priority to U.S. Provisional Application Ser. No. 60/395,073, entitled "wavelength division multiplexing source using multifunctional filters," which was filed Jul. 9, 2002, which is hereby incorporated by reference.

BACKGROUND OF THE INVENTION

1. Field of the Invention

This invention addresses a multi-wavelength fiber optic transmitter related to directly modulated laser sources and multifunctional filters.

2. General Background and State of the Art

Fiber optic communication systems use a variety of transmitters to convert electrical digital bits of information into optical signals that are carried by an optical fiber to a receiver. In a directly modulated transmitter the output intensity of a laser is modulated by directly changing the injection current driving the laser. In an externally modulated transmitter, the intensity of a continous wave laser is modulated via the use of a modulator, which changes the intensity of the laser light. Directly modulated semiconductor lasers are typically compact, integrable, and have large responses to modulation. They are comparatively inexpensive than externally modulated transmitters, which require an intensity modulator following the laser source. However, directly modulated lasers may suffer from a drawback; namely, their outputs may be highly chirped. As a result, directly modulated lasers are normally used for short reach applications because the inherent chirp of the laser causes the transmitted pulses to be distorted after propagation in dispersive fiber. For longer reach applications, external modulation is used. However, external modulation requires a costly modulator that consumes power, introduces loss, and takes up board space.

INVENTION SUMMARY

This invention provides a system that combines a wavelength multiplexer with a frequency modulated (FM) discriminator for chirp reduction and wavelength locker in a filter to produce a wavelength division multiplexed signal with reduced chirp. A FM modulated laser and an optical discriminator as described in U.S. Pat. No. 6,104,851 may be used with this invention, which is incorporated by reference into this application. In this technique, the laser is initially biased to a current level high above threshold. A partial amplitude modulation (AM) of the bias current is affected such that the average power output remains high. The partial amplitude modulation also leads to a partial but significant modulation in the frequency of the laser output, synchronous with the power amplitude changes. This partially frequency modulated output may then be applied to a filter, such as a thin film filter or a fiber Bragg grating, or any type of filter known to one in the art, which is tuned to allow light only at certain frequencies to pass through. This way, a partially frequency modulated signal is converted into a substantially amplitude modulated signal. Simply, frequency modulation is converted into amplitude modulation. This conversion increases the extinction ratio of the input signal and further reduces the chirp.

A wavelength division multiplexing (WDM) method is used for transmitting high capacity information through fiber optics systems where digital information is carried on separate wavelengths through the same fiber. Separate transmitters normally generate their respective signals that are transmitted at different wavelengths. These signals are then combined using a wavelength multiplexer to transmit the high capacity information through the fiber optic system. Various technologies can be used to multiplex the signals such as, for example, thin film filters, or arrayed waveguide gratings.

In a WDM system, a wavelength locker may also be used that fixes the center wavelength of a transmitter to a reference. Wavelength lockers may include etalons or fiber gratings, either of which provides a reference wavelength. A control circuit typically compares the wavelength of the transmitter to the reference. An error signal adjusts the transmitter wavelength by varying temperature or by other means to keep it locked to the reference wavelength.

DETAILED DESCRIPTION OF THE PREFERRED EMBODIMENTS

Figure 1:
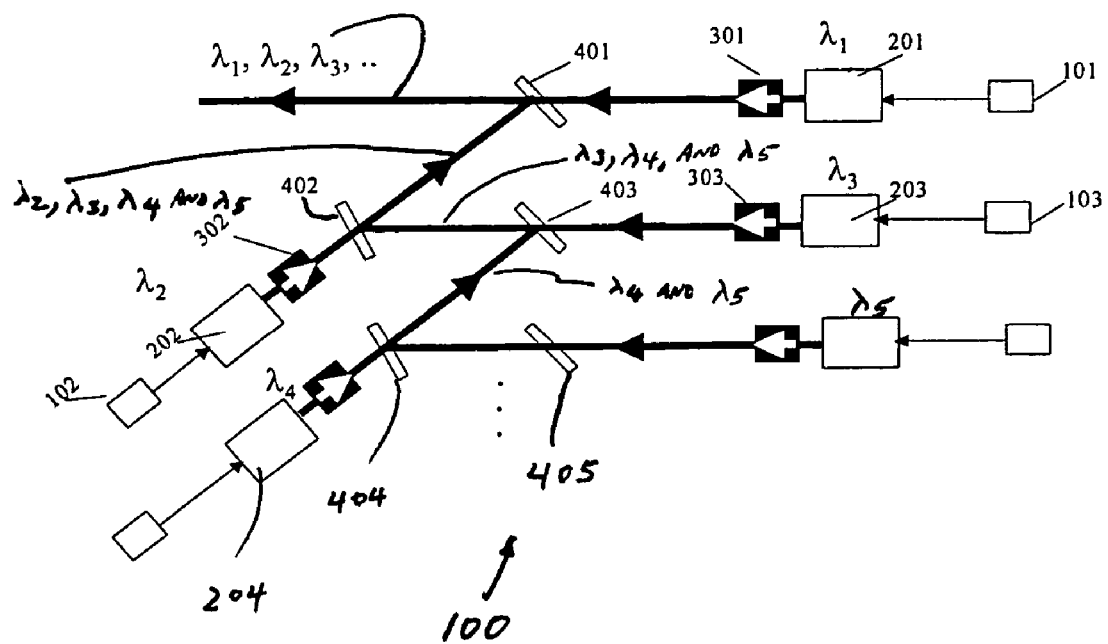
FIG. 1 illustrates a WDM source including distributed feed-back (DFB) laser sources multiplexed by filters that operate also as optical discriminators and wavelength lockers.

FIG. 1 illustrates a system 100 capable of producing a wavelength division multiplexed (WDM) source for long reach applications where multiple appropriate filters may be used for multiplexing, optical frequency discrimination, and wavelength locking. The system 100 may include a plurality of current modulators 101, 102 and 103, coupled to a plurality of laser sources 201, 202, and 203, respectively. Each of the current modulators may directly current-modulate the digital signals provided from the corresponding laser sources. The system 100 may also include optical isolators 301, 302, and 303 on the output side of the respective laser sources 201, 202, and 203. The optical isolators may be incorporated into the system 100 to prevent optical feedback into the lasers, which can degrade their performance. The system 100 includes filters 401, 402, and 403, which are positioned in such a way that wavelength channel from one laser source is reflected in the same direction as the transmitted light from another laser source.

The laser sources may be laser diode chips, each capable of producing a different wavelength signal than the other. The plurality of laser diode chips such as 201, 202, and 203, each having a different wavelength may be multiplexed using filters 401, 402, and 403, respectively. The filters may be substantially matched in wavelength to the lasing frequency of the single mode laser diode. The laser diodes may be distributed feedback lasers with stable single mode operation. The filters may be designed so that they transmit a narrow band of wavelengths near a central wavelength, and reflect most or all other wavelengths. The filters may be positioned relative the directions of different lasers to transmit the wavelength of the laser to be multiplexed. For example, the position or angle of each filter may be adjusted in such a way to reflect most or all other wavelength channels from the other lasers into the same direction as the transmitted light from the first laser. In this way the optical signals from a number of sources with different wavelengths may be directed into a common port; i.e. multiplexed.

A multiplicity of such laser outputs can be directed to the same output port using a number of similarly placed filters as illustrated in FIG. 1. In this example, a filter 405 may be provided to convert a laser having a wavelength $\lambda_5$ with a partially frequency modulated signal to a substantially amplitude modulated signal with wavelength $\lambda_5$. In this regard, U.S. Pat. Ser. No. 10/289,944 entitled "Power Source for a Dispersion Compensation Fiber Optic," filed Nov. 6, 2002, which discloses converting frequency modulated signal to amplitude modulated signal, is incorporated by reference. The filter 404 may be positioned to reflect the laser having $\lambda_5$ wavelength in substantially same direction as the laser having $\lambda_4$ wavelength, resulting in a first multiplexed signal with wavelengths $\lambda_4$ and $\lambda_5$. The filter 403 is positioned to reflect the first multiplexed signal in substantially same direction as the laser having $\lambda_3$ wavelength, resulting in a second multiplexed signal with wavelengths $\lambda_3$, $\lambda_4$, and $\lambda_5$. The filter 402 is positioned to reflect the second multiplexed signal in substantially same direction as the laser having $\lambda_2$ wavelength, resulting in a third multiplexed signal with wavelengths $\lambda_2$, $\lambda_3$, $\lambda_4$, and $\lambda_5$. The filter 401 is positioned to reflect the third multiplexed signal in substantially same direction as the laser having $\lambda_1$ wavelength, resulting in a fourth multiplexed signal with wavelengths $\lambda_1$, $\lambda_2$, $\lambda_3$, $\lambda_4$, and $\lambda_5$. Accordingly, the optical signals from a number of sources with different wavelengths may be directed into a common port or multiplexed.

These filters may be produced by the deposition of multiple layers of a dielectric material on a transparent substrate. Software tools may allow one skilled in the art to design a filter with a desired transmission profile, by choosing the various layers of the dielectric.

Figure 2:
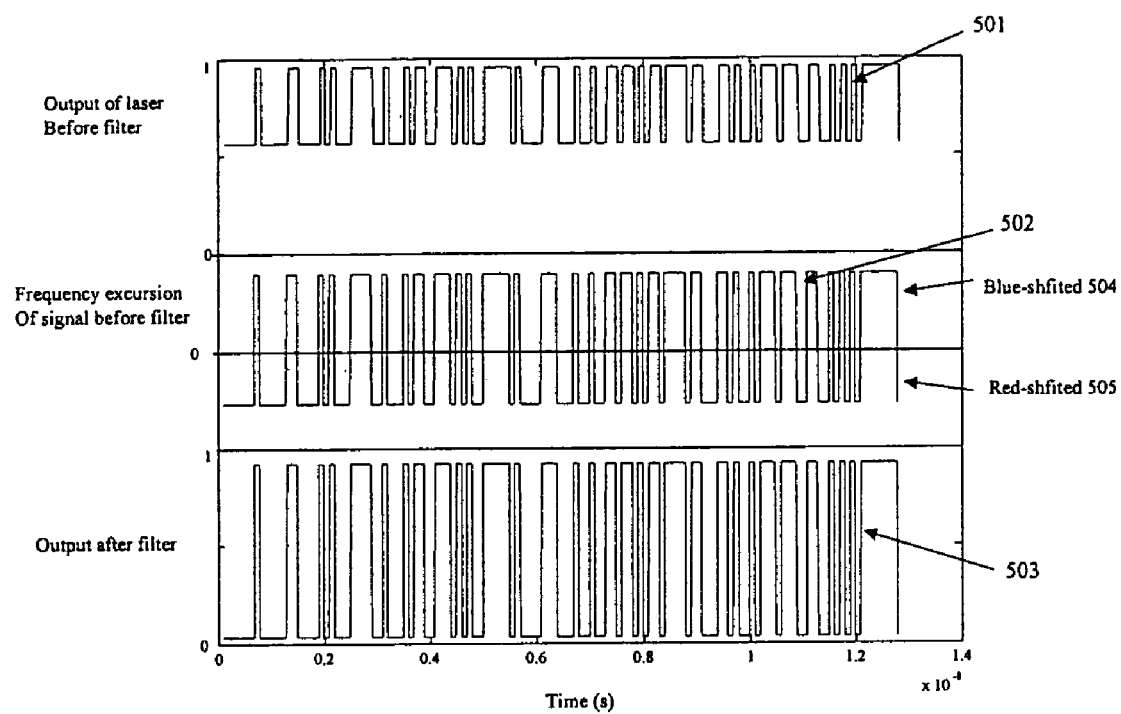
FIG. 2 illustrates an optical output of a DFB laser before and after the filter for non-return-to-zero (NRZ) data modulation.

FIG. 2 illustrates the modulated signal of any one of the diode lasers which may be directly current-modulated by a digital signal using current modulators 101, 102, or 103, for each of the respective laser diodes chips, while biased high above their respective threshold currents. This biasing condition may produce optical signals 501 with low extinction ratio, but with low residual chirp. The extinction ratio before the filter may be about 2-4 dB. In this case, the output may have a large frequency modulation in addition to amplitude modulation because of the inherent linewidth enhancement effect in semiconductor lasers. FIG. 2 illustrates the frequency excursion 502 of the output as a function of time for a non-return-to-zero NRZ signal under the condition that transient chirp may be low compared to the adiabatic chirp component. Transient chirp may be associated with the edges of the pulses, while adiabatic chirp may be the frequency excursion for the quasi-steady state 1 and 0 levels. The filter may convert this frequency modulation to amplitude modulation, producing an optical signal 503 having an enhanced extinction ratio higher than 10 dB. The resulting signal may also have low chirp. This may be done by keeping the laser high above threshold to minimize large residual chirp and transient ringing in the case of NRZ data modulation. The modulated output of the laser may have a return-to-zero (RZ) format in which the signal returns to zero between consecutive 1s. In an NRZ signal the optical signal remains high (does not return to zero) between consecutive 1s. The signal modulating the signal may also be a sinusoidal RF signal. In this case the discriminator may convert the sinusoidal input to optical pulses.

Figure 3:
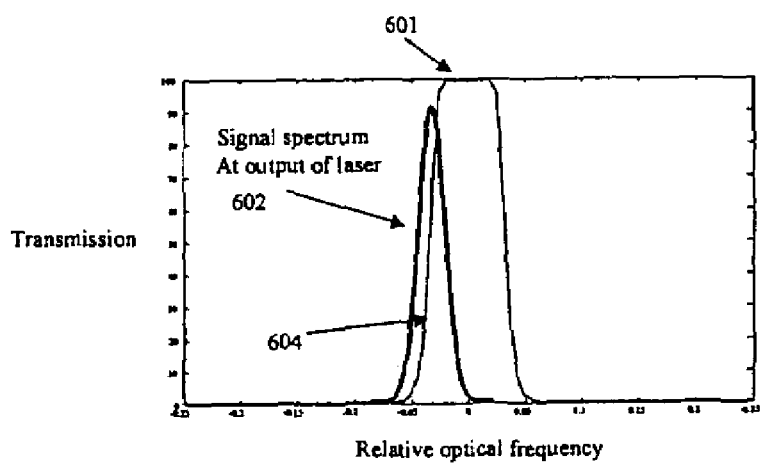
FIG. 3 illustrates an optical spectrum of the laser and filter in operating condition of the device, in reflection.
Figure 4:
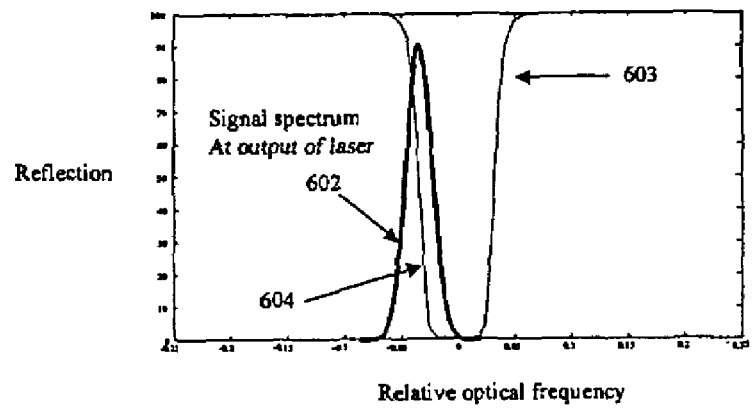
FIG. 4 illustrates an optical spectrum of the laser and filter in operating condition of the device, in transmission.

FIGS. 3 and 4 show the transmission 601 and reflection 603, respectively, of a filter that may be used with this invention. There may be a band in wavelength over which the filter transmits most of the light in that wavelength range, while most or all of the wavelengths outside that band are reflected. The sum of transmission and reflection may be nearly 100%. For this purpose, the filter's edge 604 may be used where reflection and transmission vary as a function of frequency or wavelength. The laser spectrum 602 is also shown at the output relative to the filter shape. The signal spectrum may be substantially near the filter edge 604 when the transmission vs. frequency slope is high, typically about 1 dB/GHz. The edge of the filter may act as an optical discriminator and may be used to convert frequency modulation of the laser to amplitude modulation to produce low-chirp optical output with high extinction, as described below and in U.S. Pat. No. 6,104,851 and references therein. In the case of NRZ modulation as illustrated in FIG. 2, the laser spectrum may be tuned to be on the long wavelength edge of the filter spectrum such as to transmit the blue-shifted components of the laser output and reflect the red-shifted components.

In the case of FIG. 2, the blue-shifted components 504 may be 1 bit while the red-shifted components 505 may be 0 bits, which are relatively red-shifted compared to the average wavelength of the laser output. In the case of RZ modulation, the blue-shifted components, which are coincident with the rising edges of the optical pulses may be transmitted, while rest is reflected.

Figure 5:
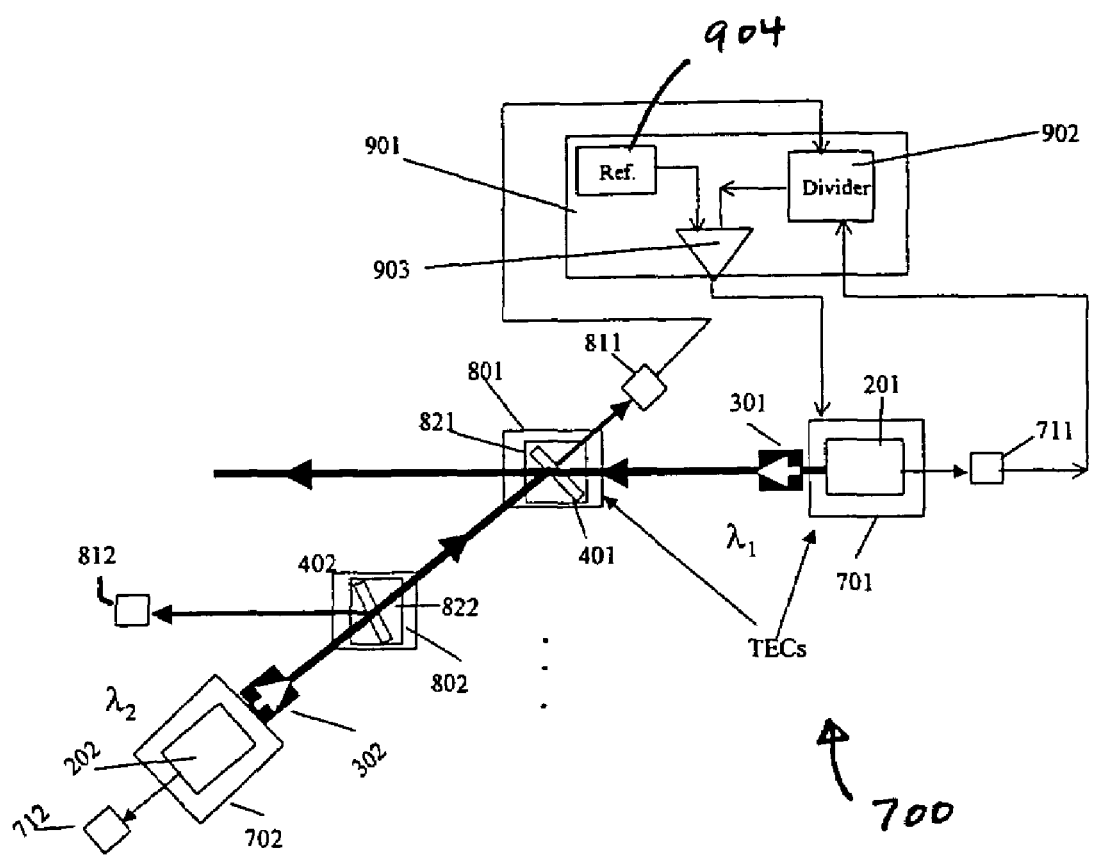
FIG. 5 illustrates a wavelength locking circuit.

FIG. 5 illustrates a system 700 for using filters to simultaneously lock the wavelengths of the multiplicity of laser diodes. The lasers 201 and 202, and the filters 401 and 402, may be mounted on separate thermo-electric coolers (TECs) 701, 702, 801, and 802, respectively. A first set of photodiodes 711 and 712 may monitor the optical power at the back facet of the lasers 201 and 202, respectively. A second set of photodiodes 811 and 812 may monitor power reflected from the filters 401 and 402, respectively. The system 700 also includes a wavelength locking circuit 901 having a number of independent circuits for each laserdiode/filter pair. Each circuit, such as 901, may include a comparator 903 that compares the ratio of the signals (taken using divider circuit 902) from the $PD_{filter}$ 811 to the $PD_{laser}$ 711, $r=P_{reflected}/P_{laser}$, to a fixed, set value or a reference value 904. The error signal produced in this way may then control the laser TEC 701 to adjust the laser temperature and therefore shift the laser wavelength in order to keep r substantially constant.

In FIGS. 3 and 4, if the laser wavelength drifts to longer wavelengths due to aging, for example, $P_{reflected}$ increases relative to $P_{laser}$, increasing the value of r relative to the reference value. The circuit may then cause the laser to be cooled slightly, shifting its wavelength to shorter wavelengths. This in turn decreases $P_{reflected}$ and decreases the ratio r back towards the reference value. The laser wavelength may be substantially locked to the transmission edge of the filter. To avoid wavelength drift, the temperature of each filter may be fixed by separate thermoelectric coolers, 811 and 812 and corresponding temperature sensors 821 and 822. Note that for each additional diode/filter pair, an electric circuit, such as 901, may be used to substantially lock the transmission edge of the filter.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A fiber optic communication system, comprising:
a first optical discriminator positioned to convert a first frequency-modulated signal of wavelength $\lambda_1$ into a first amplitude-modulated signal and to reflect a multiplicity of multiplexed signals with wavelengths $\lambda_2, \ldots, \lambda_n$, which are different from $\lambda_1$, so that the first amplitude-modulated signal of wavelength $\lambda_1$ and the multiplicity of multiplexed wavelengths $\lambda_2, \ldots, \lambda_n$ are made to propagate in substantially the same direction to form a wavelength multiplexed signal with wavelengths $\lambda_1, \lambda_2, \ldots, \lambda_n$.

2. The system according to claim 1, in which the multiplexed signals with wavelengths $\lambda_1, \ldots, \lambda_n$, are generated by other sources.

3. The system according to claim 1, where the optical discriminator is adapted to reflect a portion of the first frequency-modulated signal to produce a reflected signal that is used to wavelength lock the first frequency-modulated signal.

4. The system according to claim 3, further including a wavelength locking circuit adapted to wavelength lock the first frequency-modulated signal by comparing a first optical power of the first frequency-modulated signal to a second optical power of the reflected signal and then adjusting the first frequency-modulated signal to keep the ratio of the first frequency-modulated signal to the reflected signal substantially constant.

5. The system according to claim 1, where the first optical discriminator compensates for a fraction of the dispersion in a transmission cable.

6. The system according to claim 1, further including a laser source to provide the first frequency-modulated signal of wavelength $\lambda_1$, and an optical isolator between the laser source and the first optical discriminator.

7. The system according to claim 1, wherein the first optical discriminator is a coupled multicavity filter.

8. The system according to claim 1, wherein the first optical discriminator is formed from a stack of thin materials having different dielectric constants.

9. The system according to claim 1, where the modulating signal is non-return to zero.

10. The system according to claim 1, where the modulating signal is return to zero.

11. The system according to claim 1, where the modulating signal is sinusoidal RF signal.

12. A fiber optic communication system, comprising:
a first optical discriminator adapted to convert a first frequency-modulated signal into a first amplitude-modulated signal;
a second optical discriminator adapted to convert a second frequency-modulated signal into a second amplitude-modulated signal and to reflect the first amplitude-modulated signal so that the first amplitude-modulated signal and the second amplitude-modulated signal are substantially in the same direction to form a first wavelength multiplexed signal.

13. The system according to claim 12, further including a first wavelength locking circuit adapted to wavelength lock the first frequency-modulated signal by comparing a first optical power against a second optical power of the reflected signal of the first frequency-modulated signal and then adjusting the first frequency-modulated signal to keep the ratio of the frequency-modulated signal to the reflected signal substantially constant.

14. The system according to claim 13, further including:
a third optical discriminator adapted to convert a third frequency-modulated signal into a third amplitude-modulated signal and to reflect the first wavelength multiplexed signal so that the third amplitude-modulated signal and the first wavelength multiplexed signal are substantially in the same direction to form a second wavelength multiplexed signal.

15. The system of claim 14, where the third optical discriminator is adapted to reflect a portion of the third frequency-modulated signal to produce a third reflected signal which is used to wavelength lock the third frequency-modulated signal.

16. The system according to claim 12, further including a laser source to provide the first frequency-modulated signal, and an optical isolator between the laser source and the first optical discriminator.

17. The system according to claim 16, where the laser source is a semiconductor laser diode.

18. A fiber optic system capable of multiplexing, the system comprising:
a first laser source capable of transmitting the first frequency-modulated signal;
a first optical discriminator adapted to convert a first frequency-modulated laser signal into a first amplitude-modulated signal;
a second laser source capable of transmitting a second frequency-modulated laser signal, where the wavelength of the first frequency-modulated is different from the wavelength of the second frequency-modulated laser signal; and
a second optical discriminator positioned relative to the first and second laser sources such that the optical discriminator converts the second frequency-modulated laser signal to a second amplitude-modulated laser signal and reflects the first amplitude-modulated laser signal so that the first and second amplitude-modulated laser signals propagate in substantially the same direction to form a first wavelength multiplexed laser signal.

19. The system according to claim 18, further including a wavelength locking circuit adapted to wavelength lock the first frequency-modulated laser signal by comparing a first optical power of the first frequency-modulated laser signal to a second optical power of the reflected signal and then adjusting the first frequency-modulated laser signal to keep the ratio of the first frequency-modulated laser signal to the reflected signal substantially constant.

20. The system according to claim 19, where the first laser source is coupled to a laser cooler, if the second optical power of the reflected signal increases relative to the first optical power, then cooling the laser cooler to shift the wavelength of the first amplitude-modulated laser signal to be shorter.

21. The system according to claim 19, where the first optical discriminator is coupled to a discriminator cooler to fix the temperature of the first optical discriminator to minimize wavelength drift.

22. A method for multiplexing at least two signals, the method comprising:
- converting a first frequency-modulated laser signal to a first amplitude-modulated laser signal; and
- reflecting a multiplexed laser signals with different wavelengths in substantially the same direction as the wavelength of the first amplitude-modulated laser signal.

23. The method according to claim 22, further including:
- cooling the first amplitude-modulated laser signal to shorten its wavelength to decrease the power of the laser from the step of reflecting.

* * * * *